April 27, 1954 W. G. McGONIGLE 2,676,584
HOT-WATER HEATER AND SYSTEM THEREFOR
Filed Aug. 3, 1949
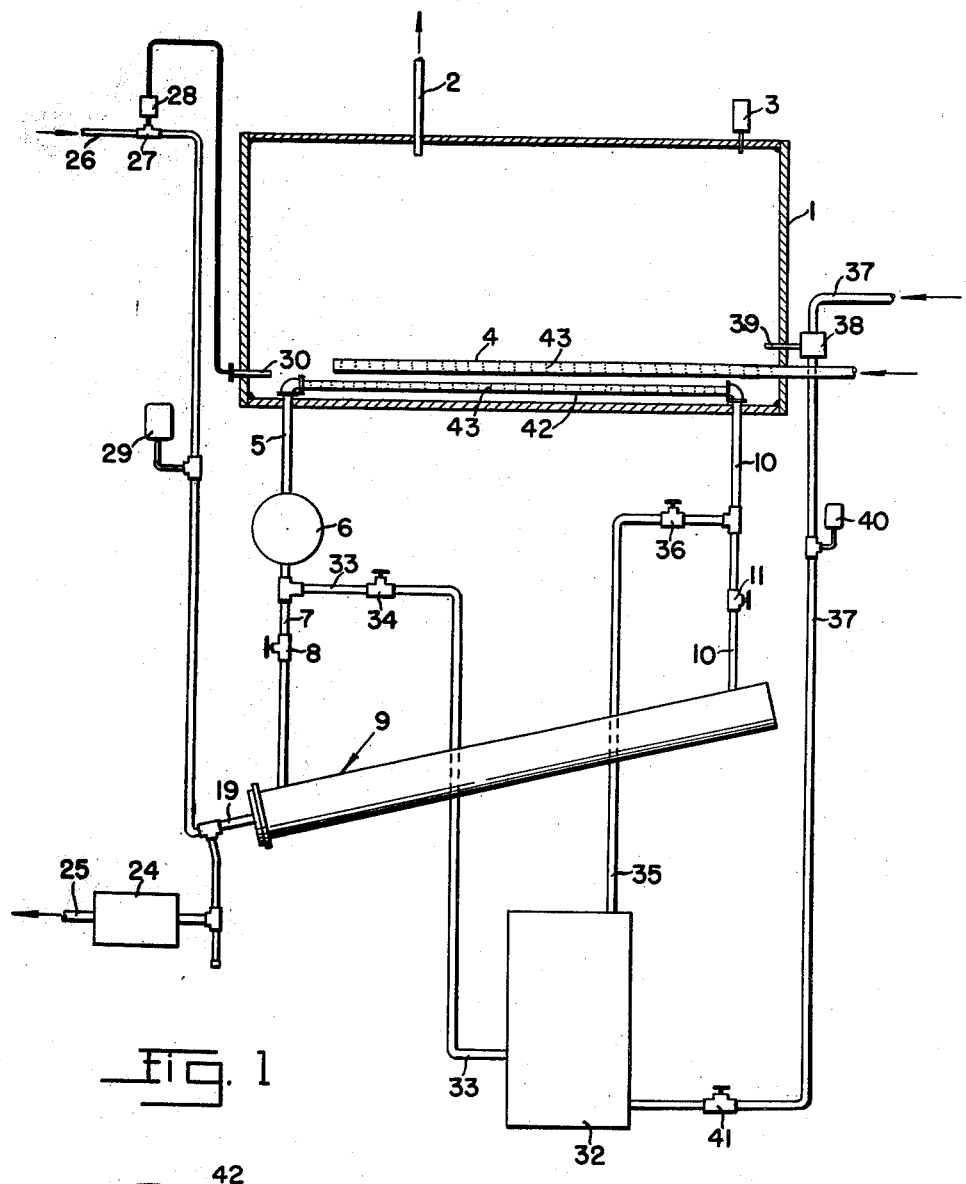
INVENTOR
WILLIAM G. MC GONIGLE
BY Toulmin & Toulmin
ATTORNEYS Patented Apr. 27, 1954

2,676,584

UNITED STATES PATENT OFFICE 2,676,584

HOT-WATER HEATER AND SYSTEM THEREFOR

William George McGonigle, Middletown, Ohio

Application August 3, 1949, Serial No. 108,291

4 Claims. (Cl. 126—362)

The present invention relates to hot water heaters and systems therefor, particularly for large installations such as office buildings, hotels, etc.

In certain localities, especially those depending on well or "hard" water, the problem of liming and scaling of the pipes which come into contact with the water is extremely important. The solids, salts, etc. in the water precipitate, and deposit on the various exposed surfaces including the interior of the pipes, the heater and the tank. In the event that the pipes are maintained at an elevated temperature for heating purposes, this deposit does not readily flake off but instead becomes baked and hardens into a solid, firmly adhering mass. The precipitation is encouraged in water which lacks movement. The effects of liming are that the pipes become clogged and the precipitate starts a rusting or other chemical action, particularly around the joints to cause leakage. Liming also reduces the facility with which heat is transferred from one surface to another since it is a poor conductor of heat.

The primary object of the invention is to provide a hot water system suitable for large capacity installations and in which the phenomenon of liming and precipitation of the solids in the water is eliminated.

Another object is to provide a hot water system suitable for localities in which only "hard" water is available and in which the deposition of solids, salts, etc. are reduced, preferably eliminated, so that the system including the heater remains interiorly clean and operates at maximum efficiency from the standpoint of circulation of water.

A still further object is to provide a hot water system heated by steam, gas, or electricity and in which the heating efficiency is increased by preventing liming of the system and by providing improvements in the heater by which a greater transference of heat between the source and water is effected.

Another object is to provide a non-liming hot water system suitable for localities in which only "hard" water is available and employing a pump for circulating the water through the heating system and preventing permanent liming effects in the heater when the pump is stopped.

A still further object is to provide a hot water system employing steam or gas as a heating medium and in which the heat transfer from the heating medium to the water is maintained at a maximum.

Another object of the invention is to provide a hot water system including a hot water storage tank together with a pump and heater for supplying hot water to the tank without undue agitation of the hottest portion of the water in the tank.

Another object is to provide a heating system including a hot water storage tank therein in which there is greater circulatory flow of water back from the tank to the heater, and the water recirculated from the tank is taken from the coolest portion of the tank in order to obtain the maximum heat transfer between the water and the source of heat.

A final object is to provide a hot water system for large capacity installations and employing a pump for circulating the water together with automatic devices for cutting off the water from the pump to the heater when the coolest portion of the hot water tank has attained a temperature above a predetermined value.

The above and other objects are carried out in brief, by providing a system in which the water at the coolest portion of the tank is caused continuously to recirculate at a velocity greater than the normal speed of convection flow. The water is caused to flow under pressure through the heater to prevent precipitation of the solids and any solids that may have been deposited during the time that the recirculation of the water is cut-off are left in an unbaked condition so that the reapplication of the recirculatory flow will dislodge the deposited material from the various exposed parts.

The invention will be better understood when the following specification is perused in connection with accompanying drawings in which:

Figure 1 represents diagrammatically, but with the storage tank in section, the improved non-liming hot water system as applied to a steam, or alternately, to a gas heater;

Figure 2 is a greatly enlarged sectional view of the hot and cold water pipes employed in the tank shown in Figure 1.

Reference character 1 designates a hot water storage tank, typically shown in a horizontal position and constituted of a large capacity enclosure with welded seams. The service outlet from the tank is indicated at 2 and normally is positioned at the uppermost portion of the tank. A steam relief valve 3 of any suitable and well known design may be inserted in the tank at the upper portion thereof to relieve the tank of any steam in the event of failure of the temperature safety device as explained hereinafter. There is an opening at the lower end of the tank for receiving pipe 4 connected to a suitable source of cold water. This pipe always remains open. Its purpose is to maintain the system full of water to make up for water that is withdrawn at the service pipe 2. The recirculatory system by which the water in tank 1 is maintained at a predetermined elevated temperature is constituted of an outlet pipe 5 which leads to a motor driven pump 6 of any suitable and well known type. From the pump, a pipe 7 is taken through the valve 8 to a heater 9 and the latter discharges through a pipe 42 and a valve 11 into the lower portion of the tank.

The condensed steam or drainage can run through a trap 24 of any suitable and well known type to remove any solid material and also to prevent the escape of steam. From this trap the water may pass through a pipe 25 back to the steam boiler, or if desired, conducted to the drain.

The steam for energizing the heater 9 is introduced at a pipe 26 through an automatic shut off valve 27 of any suitable type, such as a slide valve which may be electro-magnetically operated, as indicated at 28. At a suitable position between the valve 27 and the steam inlet line 19 there is a conventional pressure responsive switch 29, this switch being in series with a motor which operates the pump 6. There is a thermostat 30 of any suitable type such as a bimetallic strip positioned at the lower end of the tank 1 and electrically connected to the electro-magnetically operated valve 28. The purpose of this thermostat, which may be set to operate between predetermined temperature limits, is to open the steam line 26 when the temperature of the water at the lower portion of the tank 1 becomes less than the predetermined temperature and to close the valve 27 when the temperature of the water exceeds a predetermined temperature. Thus, within the same temperature range as when the valve 27 is automatically opened, the pressure in the steam line 26 will operate the switch 29 and cause the motor of the pump 6 to become energized. Thus the pump operates automatically whenever steam passes the valve 27 into the heater 9.

From the foregoing, it is evident the system explained up to this point employs a steam heater 9 and a pump 6 which, within certain temperature limits of the water in the tank 1 keeps this water in a continuous state of agitation, particularly the lower portion within the tank, and this agitation obviously causes the solid particles in the water to remain in a state of suspension. Thus no liming or scaling effects can take place, either at the bottom of the tank 1 or within the heater 9.

It will be noted that the movement of the cold water from the pipe 4 is in the same direction and at approximately the same position as the movement of the hot water passing through pipe 42 and this moving water is located at the bottom of the tank, remote from the hotter stratum of water at the top. Consequently, there is no lowering of the temperature of this heated water in the region of the service line 2 and only a relatively small quantity of water located at the bottom of the tank need be moved by the suction effect of the pump 6 in order effectively to keep the solid particles of the recirculated water in suspension and prevent any permanent deposit of these particles in the tank or the heater. The pump 6 can therefore be of a relatively small size. The pipes 4 and 42 are perforated as indicated at 43 in Fig. 2.

In accordance with another feature of my invention, there is provided, by way of an alternative or added use, a gas heater of any suitable and well known type for heating the recirculated water. A pipe 33 is taken from the pressure side of the pump 6, the water passing through a hand-operated valve 34 to the heater. The pipe 33 may communicate with a heater 32 provided with a copper coil (not shown), this coil being located in a flame or heated air produced by a gas burner (not shown). The upper end of the copper tubing may communicate with a pipe 35 which connects with the pipe 10 at a position between the valve 11 and the tank 1. A hand-operated valve 36 may be inserted in the water line 35. A gas supply pipe 37 may be provided, having connected therein an automatic opening and closing valve 38 which is electrically or pneumatically operated by a thermostat 39. As in the case of the thermostat 30, the gas control thermostat 39 is positioned at the lower portion of the tank 1. A pressure operated switch 40 is inserted in the line 37, this switch being connected in series with the motor of the pump 6 so that when gas is passing through the pipe into the heater, the pressure thereof will close the switch 40 and cause the pump 6 to operate. A hand operated valve 41 is inserted in the gas line 37 next to the heater for safety purposes.

It is apparent that by closing the valves 8 and 11 and opening the valves 34 and 36 the water delivered by the pump 6 will pass through the gas heater 32 so that the latter can be used, either as a standby, or as an additional source of heat for raising the temperature of the water in the tank 1.

The thermostat 39 controls the flow of gas through the pipe 37 and therefore maintains the temperature of the water in the tank 1 within a predetermined temperature range. In place of gas heater 32 I may, if desired, employ an oil burner using the same connections therein in order that the oil heater can be operated either in place of the steam heater 9 as when the valves 8 and 11 are closed, or in addition to the steam heater, as when all of the valves 8, 34, 36 and 11 are left open. It is further apparent that in place of the steam heater 9, I may employ an electric heater in which the pipe 16 is heated by radiation and conduction from an electric heater unit inserted insulatingly within the pipe. The conductors to the heater can be connected serially through the thermostat 30 so that when the proper temperature of the water at the bottom of the tank has been reached the thermostat will serve to interrupt the electric circuit connected to the heater and to the motor of the pump. Only the single pump 6 is necessary to furnish the recirculatory water, either to the steam heater 9, or the gas or oil heater 32, or to all of the heaters in combination.

It is obvious that the water flowing through the pipe 42 has its choice of moving outwardly through the perforations 43 or continuing its travel through the pipe back to the pump. Some of these perforations therefore serve as suction orifices for the pump, while others permit the hot water to issue therefrom in various directions in such a way as to cause the least disturbance of the upper level of water, but provide a strong movement of water along the bottom of the tank to keep the solid particles in suspension. This suspension of particles is maintained throughout the entire recirculatory path of the water, including the heater element.

While preferred specific embodiments of the invention are hereinbefore set forth, it is to be clearly understood that the invention is not to be limited to the exact construction illustrated and described, because various modifications of these details may be provided in putting the invention into practice within the purview of the appended claims.

Having thus fully described my invention, what I claim as new and desire to secure by Letters Patent, is:

1. A hot water system comprising a tank having a bottom wall and side walls, a hot water inlet pipe and a hot water outlet pipe extending into said tank through said bottom wall, means for connecting said hot water pipes comprising a third pipe, said third pipe being perforated and extending along said bottom wall in parallel relationship thereto, a perforated cold water pipe positioned along said bottom wall and being parallel to said third pipe and said bottom wall, means for injecting cold water into said cold water pipe including an inlet pipe extending through one of said side walls, a recirculatory liquid path connecting said hot water pipes exteriorly of said tank and including a pump and a heater, said pump forcing water through said third pipe in the same direction as the flow of water in said cold water pipe, a thermostat in said tank positioned near said hot water outlet pipe, and means controlled by said thermostat for turning said pump either on or off depending on the temperature of said thermostat and a hot water outlet pipe near the top of said tank.

2. A hot water system comprising a tank having a bottom wall and side walls, a hot water inlet pipe and a hot water outlet pipe extending into said tank through said bottom wall at remote ends thereof, means for connecting said hot water pipes comprising a third pipe, said third pipe being perforated and extending along said bottom wall in parallel relationship thereto, a perforated cold water pipe positioned along said bottom wall and being parallel to said third pipe and said bottom wall, means for injecting cold water into said cold water pipe including an inlet pipe extending through one of said side walls, a recirculatory liquid path connecting said hot water pipes exteriorly of said tank and including a pump and a heater, said pump forcing water through said third pipe in the same direction as the flow of water in said cold water pipe, a thermostat in said tank positioned near said hot water outlet pipe, and means controlled by said thermostat for turning said pump either on or off depending on the temperature of said thermostat and a hot water outlet pipe near the top of said tank.

3. A hot water system comprising a tank having a bottom wall and side walls, a hot water inlet pipe and a hot water outlet pipe extending into said tank through said bottom wall at remote ends thereof, means for connecting said hot water pipes comprising a third pipe, said third pipe being perforated and extending along said bottom wall in parallel relationship thereto, a perforated cold water pipe positioned along said bottom wall and being parallel to said third pipe and said bottom wall, said cold water pipe extending across substantially the entire bottom of the tank and being adjacent said third pipe throughout substantially its entire length, means for injecting cold water into said cold water pipe including an inlet pipe extending through one of said side walls, a recirculatory liquid path connecting said hot water pipes exteriorly of said tank and including a pump and a heater, said pump forcing water through said third pipe in the same direction as the flow of water in said cold water pipe, a thermostat in said tank positioned near said hot water outlet pipe, and means controlled by said thermostat for turning said pump either on or off depending on the temperature of said thermostat and a hot water outlet pipe near the top of said tank.

4. A hot water system comprising a tank having a bottom wall and side walls, a hot water inlet pipe and a hot water outlet pipe extending into said tank through said bottom wall at remote ends thereof, means for connecting said hot water pipes comprising a third pipe, said third pipe being perforated and extending along said bottom wall in parallel relationship thereto, a perforated cold water pipe positioned along said bottom wall and being parallel to said third pipe and said bottom wall, said cold water pipe extending across substantially the entire bottom of the tank, said third pipe and said cold water pipe being spaced from each other and lying on opposite sides of the center line of said tank, means for injecting cold water into said cold water pipe including an inlet pipe extending through one of said side walls, a recirculatory liquid path connecting said hot water pipes exteriorly of said tank and including a pump and a heater, said pump forcing water through said third pipe in the same direction as the flow of water in said cold water pipe, a thermostat in said tank positioned near said hot water outlet pipe, and means controlled by said thermostat for turning said pump either on or off depending on the temperature of said thermostat and a hot water outlet pipe near the top of said tank.

References Cited in the file of this patent

UNITED STATES PATENTS

| Number | Name | Date |
| --- | --- | --- |
| 72,798 | Chapman et al. | Dec. 31, 1867 |
| 299,740 | Clark | June 3, 1884 |
| 589,454 | Winters | Sept. 7, 1897 |
| 821,939 | Harris | May 29, 1906 |
| 991,765 | Waterman | May 9, 1911 |
| 1,112,462 | Manny | Oct. 6, 1914 |
| 1,163,451 | Polmann | Dec. 7, 1915 |
| 1,241,208 | Gow | Sept. 25, 1917 |
| 1,607,152 | Eggleston | Nov. 16, 1926 |
| 1,698,561 | Ransom | Jan. 8, 1929 |
| 1,780,379 | Durdin | Nov. 4, 1930 |
| 1,967,706 | Carroll | July 24, 1934 |
| 2,095,357 | Dube | Oct. 12, 1937 |
| 2,265,108 | Berman | Dec. 2, 1941 |
| 2,274,066 | Jacocks | Feb. 24, 1942 |
| 2,291,023 | Burklin | July 28, 1942 |
| 2,358,274 | Jacocks | Sept. 12, 1944 |